United States Patent
Gomez, Jr.

(10) Patent No.: US 9,693,549 B1
(45) Date of Patent: Jul. 4, 2017

(54) RODENT SHIELD

(71) Applicant: Manuel Gomez, Jr., Gilroy, CA (US)

(72) Inventor: Manuel Gomez, Jr., Gilroy, CA (US)

( * ) Notice: Subject to any disclaimer, the term of this patent is extended or adjusted under 35 U.S.C. 154(b) by 0 days.

(21) Appl. No.: 15/201,308

(22) Filed: Jul. 1, 2016

(51) Int. Cl.
| | |
|---|---|
| *A01M 29/30* | (2011.01) |
| *E04B 1/72* | (2006.01) |
| *E04D 13/17* | (2006.01) |
| *F24F 13/08* | (2006.01) |
| *F24F 7/02* | (2006.01) |
| *E04D 13/00* | (2006.01) |
| *F24F 7/00* | (2006.01) |
| *E04D 13/152* | (2006.01) |

(52) U.S. Cl.
CPC ............... *A01M 29/30* (2013.01); *E04B 1/72* (2013.01); *E04D 13/004* (2013.01); *E04D 13/152* (2013.01); *E04D 13/17* (2013.01); *E04D 13/174* (2013.01); *E04D 13/178* (2013.01); *F24F 7/02* (2013.01); *F24F 13/082* (2013.01); *F24F 2007/003* (2013.01)

(58) Field of Classification Search
CPC ..... E04D 13/17; E04D 13/178; E04D 13/004; E04D 13/152; E04D 13/174; F24F 13/082; F24F 7/02; F24F 2007/003; E04B 1/72
USPC ...... 52/95, 101, DIG. 12; 119/712; 454/275, 454/367
See application file for complete search history.

(56) References Cited

U.S. PATENT DOCUMENTS

| | | | | |
|---|---|---|---|---|
| 2,683,969 | A * | 7/1954 | Mugnier | E02B 8/085 405/83 |
| 3,842,722 | A * | 10/1974 | Miller | F24F 13/06 137/527.6 |
| 4,823,679 | A * | 4/1989 | Robbins | F24F 7/007 454/253 |
| 5,451,239 | A * | 9/1995 | Sewell | A01M 29/30 256/1 |
| 5,819,734 | A * | 10/1998 | Deily | A61M 16/0465 128/207.15 |
| 5,913,780 | A * | 6/1999 | Goergen | A01M 29/32 156/295 |
| 6,176,047 | B1 * | 1/2001 | Morningstar | A01M 29/06 40/538 |
| 6,361,433 | B1 * | 3/2002 | Gray | F24F 13/084 454/358 |
| 7,647,736 | B2 * | 1/2010 | Dion | E04C 3/06 52/244 |
| 8,528,271 | B1 * | 9/2013 | Hemmer | E04D 13/004 52/101 |
| 2003/0009957 | A1 * | 1/2003 | Wulff | A01G 13/10 52/101 |
| 2011/0076937 | A1 * | 3/2011 | Greenberg | F24F 13/082 454/367 |
| 2013/0042544 | A1 * | 2/2013 | Sabine | E04B 1/72 52/101 |

* cited by examiner

*Primary Examiner* — Chi Q Nguyen
(74) *Attorney, Agent, or Firm* — Intellectual Property Law Group LLP

(57) ABSTRACT

Rodent shields are constructed from various gauge metal and are shaped to fit substantially flush against vertical members to prevent roof rats (*Rattus Rattus*) from traveling to and from their homes located in the upper parts of structures. The rodent shield can be installed on different diameter size vertical members by simply cutting the housing portions at the required length. The rodent shield is wide and the surface is sleek to prevent roof rats from firmly gripping the shield. The rodent shield can be used individually or used with multiple rodent shield.

19 Claims, 3 Drawing Sheets

RODENT SHIELD

BACKGROUND OF THE INVENTION

1. Field of the Invention

This invention relates to a device that prevents or controls pest/rodent infestation, more specifically, infestation of roof rats (*Rattus rattus*).

2. Background

Roof rats (*Rattus rattus*) live in high and non-accessible areas of industrial buildings, commercial buildings, or residential buildings. They have access to high areas by moving up and down pipes, conduits, and other vertical members. Once roof rats settle in a building, they rapidly reproduce five to eight young in a litter and in three months the pups become reproductively mature and independent. Usually three or more litters are produced annually.

In food-processing and storage facilities, roof rats eat grain or livestock feed and at homes or pet stores, they eat pet food and drink water left out for the pets. In addition to contaminating and destroying food, roof rats are known to damage insulation and electrical wiring. Roof rats also spread diseases such as murine typhus, leptospirosis, salmonellosis, rat-bite fever, and the plague. Roof rats can also transfer diseases to domestic animals.

Destruction of structures and gnawable materials, loss of food and feed caused by roof rats cause businesses to lose millions of dollars a year. Pet stores easily spend at least $280,000 a year to reduce or control roof rat infestation, but the attempts are either unsuccessful or if successful, only temporary. Additionally, pet stores lose $12,000 to $24,000 in destroyed merchandise because of the rats.

Many of the current rodent shields require the user to cut, mold and bend the sheet metal on-site. This is costly, dangerous, time consuming and does not guarantee an exact fit; therefore, mesh or caulking is still needed to fill in the gaps between the conduit and the rodent shield. It is also very difficult and cumbersome to install these shields because there is not a proven or exact method of installation; the installer would have to guess and hope that it stays. This can also prove dangerous to the installer because they are working on twelve foot ladders, trying to bend, shape and install the sheet metal while trying to avoid fish tanks, customers, or merchandise around the buildings. Furthermore, many of these shields are unsightly.

Accordingly, there is a need for a rodent shield that is easy to install, aesthetically pleasing, pre-molded, cost effective, and versatile.

SUMMARY

According to an embodiment, there is a rodent shield comprising: a body having at least three sides, a first side extending to a second side, the second side extending to a third side, the first side substantially parallel to the third side; the first side and third side substantially perpendicular to the second side, and at least two tapered housings, each having a first surface, a second surface, and a third surface; each tapered housing tapering from an opposing end of the body to a distal end of the tapered housing.

According to an embodiment, the rodent shield comprises at least two mounting tabs which are connected to the body at a generally perpendicular angle to the body.

According to another embodiment of the present invention, there is a rodent shield comprising: a body forming a cavity configured to cover an outer surface of a conduit and having an opening at each opposing end of the body configured for the conduit to run through, the body having an exposed side configured to lay flush against a flat surface; and at each opposing end of the body, a tapering portion tapering from the opposing end of the body to a distal end of the tapering portion such that a space between the outer surface of the conduit and an inner surface of the tapering portion at each distal end is no more than ¼ inch.

According to another embodiment, the rodent shield is prepared by a process comprising the steps of obtaining a section of a sheet metal that is at least 24 gauge; cutting the section of the sheet metal to an appropriate size; then folding the sheet metal to form the body. Next, crimp and secure the ends of the sheet metal to form the housings.

The step of cutting the section of the sheet metal may further comprise the steps of cutting a pair of slits inward from each lengthwise edge of the sheet metal, each slit symmetrically located near a corner of the sheet metal. The step of folding the sheet metal to form the body may comprise folding each lengthwise portion of the sheet metal located between the slits to form the body having a length of at least 12 inches.

The process may further comprise, forming tabs, with a separate sheet of thicker galvanized steel, cut four 2.5 inches in length by 1 inch in width strips. At 1.5 inches from one end of each tab, bend the tab at a 90 degree angle. Place the 1.5 inches side of each tab flush against the surface of a first side and a third side of the body adjacent to the cut made between the housing and body so that the tabs are substantially flush against the body. The tabs are then joined to the body via spot-welding in at least three places on each tab.

These features, advantages and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
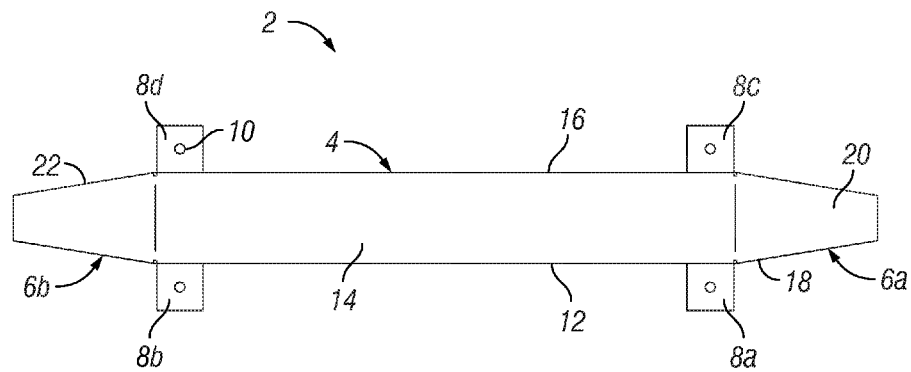
FIG. 1 illustrates a top view of the rodent shield, according to an embodiment of the present invention.

FIG. 1 illustrates a top view of the rodent shield 2, according to an embodiment comprising a body 4, housing 6a, 6b, and mounting tabs 8a, 8b, 8c, 8d. The rodent shield 2 is symmetrical along its longitudinal axis and is symmetrical along its horizontal axis. The rodent shield 2 can be painted so that it can blend into its environment and look sleek. The rodent shield 2 can be used outdoors or indoors and is used with vertical conduits. It is possible to paint/ pattern the rodent shield to make it match the surrounding environment.

Embodiments of the rodent shield 2 are ideally made from 24 gauge sheet metal; however, 18 gauge sheet metal can also be used. Any sheet metal thinner than 24 gauge will allow rats to chew through the rodent shield 2 and the mounting tabs 8a-8d will warp when drilling the rodent shield 2 into a substrate. The thicker gauge metal will also prevent the rodent shield 2 from bending, twisting, or warping. It is also ideal to have solid mounting tabs 8a-8d.

The body 4 and the housing 6a, 6b can be made from 24 gauge sheet metal and the mounting tabs 8a-8d can be made from 18 gauge sheet metal, or the housing 6a, 6b can be made from 18 gauge sheet metal and the mounting tabs 8a-8d can be made from 24 gauge sheet metal. In other embodiments, the rodent shield 2 can be made entirely of one type of sheet metal.

The body 4 comprises a first side 12, a second side 14, and a third side 16 which opposes the first side 12. The second side 14 connects the first side 12 to the third side 16. The first side 12 and third side 16 are each formed at about ninety degrees to the second side 14. The first 12 and third 16 sides of the body 4 are the two lateral panels of the body 4. The second side 14 of the body 4 is the top panel of the body 4. The bottom of the rodent shield 2 does not have a side (see FIG. 5). Having an exposed bottom side allows for the rodent shield 2 to be placed over a conduit. The length of each side of the body 4 is no less than approximately twelve inches long, the width of the second side 14 is no less than approximately 1¾ inches wide, and the height of the first side and third side is no less than approximately 1¾ inches. While the example illustrated in the FIG. 1 includes specific dimensions, it will be understood that many other sizes and shapes of the rodent shield 2 can be used. The length and the width of the body 4 can be made longer and wider so as to accommodate for the size of the conduit. For example, the square shape of the body can be rounded.

The length of the body 4 prevents rodents from climbing up and jumping onto other structures. The location of the mounting tabs 8a-8d on the body 4 prevents the rodents from reaching up and grabbing any of the mounting tabs 8a-8d and using it as a step to move up or down. For example, mounting tabs 8a and 8c are located beginning at the edges of the body 4 opposite mounting tabs 8b and 8d which begin at the opposite edges of the body 4. The center point of mounting tabs 8a and 8c are approximately 11 inches apart from the center point of mounting tabs 8b and 8d, at a distance. This distance of about 11 inches, along with the height of the body of at least 1¾ inches, prevents the rodents from using the tabs 8a-8d as steps, making the shield impassible. Rodents will try to climb up the body 4; however, they will not be able to climb up the entire length of the body 4 without sliding back down because the sheet metal is a smooth surface and the length of the body 4 is longer than the reach of the rodents. The length of the body 4 also prevents the rodent from jumping from one end of the rodent shield 2 to the other end of the rodent shield 2.

The rodent shield 2 also makes it difficult for rodents to climb down a conduit. As the rodent tries to climb down the rodent shield 2, it will not be able to grip the body 4 and fall. Since the rodent shield 2 is normally installed high from the ground, the fall can injure the rodent and discourage it from trying to climb back up the conduit. Once the rodents are on the ground, it would prevent them from climbing back up the conduit and into the roof. As such, the rodent shield 2 prevents new rodents from climbing up and prevents current rodents living in the roof area to climb down to retrieve food and water. Once the food and water supply is cut from their dwelling, the rodents either die or decide to move elsewhere. The rodent shields 2 are placed around conduits with high rodent traffic.

The width of the body 4 prevents rodents from wrapping their legs and feet around the body 4 to obtain a strong grip because it is too wide. Without the ability to grip, the rodents cannot grasp the body 4 and cannot make their way up or down the rodent shield 2. The first side 12 and third side 16 of the body 4 can be wider than the width of the second side 14.

Figure 2:
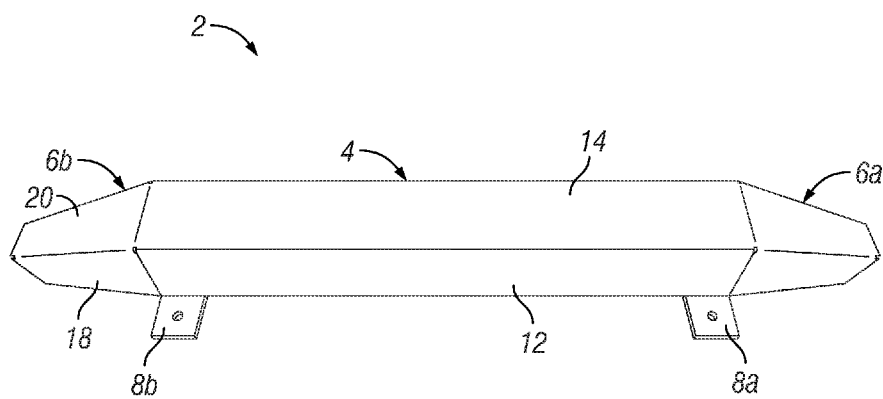
FIG. 2 illustrates a top perspective view of the rodent shield, according to an embodiment of the present invention.

As shown in FIGS. 1 and 2, there are two housings 6a, 6b located at opposing ends of the body 4. The housings 6a, 6b comprise a housing first side 18, a housing second side 20 and a housing third side 22 and is adjustable in size. The housings 6a, 6b are tapered toward the ends of the body, with the region closest to the body 4 being the tallest and the region furthest from the body being the lowest. The rodent shield 2 is versatile and can accommodate multiple conduit sizes by simply cutting the tapered housings 6a, 6b. The rodent shield 2 can be used on ½ inch, ¾ inch, or 1 inch diameter vertical pipes or conduits by shortening the housings 6a, 6b by simply cutting the housings 6a, 6b in a width-wise direction at the appropriate location so that the conduit will fit snugly within the housings 6a, 6b. If the user needs to fit a larger diameter conduit in the rodent shield 2, then the user will cut the housings 6a, 6b closer to the body 4 thereby providing a wider diameter housing 6a, 6b. The adjustability of the housings 6a, 6b ensures that the user will be able to secure the housings 6a, 6b snug against the conduit. It eliminates the need to use mesh, caulk or other fillers to fill in the gap between the conduit and the housings 6a, 6b. Since the housings 6a, 6b are secure and snug against the conduit with no gaps in between, the rodent cannot climb through the housings 6a, 6b and body 4.

The embodiment shown in FIG. 1 accommodates ½ inch conduit. It will be understood that the embodiment depicted in FIG. 1 is exemplary and for illustrative purposes only, and that other rodent shield 2 sizes and shapes can be used without departing from the scope of the embodiments disclosed herein.

The mounting tabs 8a, 8b, 8c, 8d illustrated in FIG. 1 are substantially square in shape with a hole 10 substantially situated in the middle. Further description will be provided below.

FIG. 2 illustrates a top perspective view of the rodent shield 2, according to an embodiment. FIGS. 1-2 illustrate the four mounting tabs 8a-8d coupled to the first side 12 and third side 16 of the body 4. The mounting tabs 8a-8d are coupled to the edges of the body 4 where the body 4 transitions to the housing 6a, 6b. As mentioned above, the mounting tabs 8a-8d are substantially square in shape and comprise a hole 10 substantially in the middle of the mounting tab 8a-8d. The hole 10 accommodates number six screws; however, the holes 10 can be larger or smaller, but smaller screws are not recommended as the weight of the rodent shield 2 plus the rodent can be too heavy for the screws to support. The portion of the mounting tabs 8a-8d that extend out from the body 4 and connect the rodent shield 2 to the substrate can be about 1 inch in width and 1 inch in height; however other dimensions can be contemplated. The rodent shield 2 can be mounted to the substrate by double back tape or other types of adhesives. To make the installation permanent on a substrate such as a block wall interior or exterior or just the exterior of a building, the user can install the rodent shield 2 by drilling right into the wall through the mounting tabs 8a-8d and then using a dry wall shield or concrete shield. The shape of the mounting tabs 8a-8d can be changed to make the rodent shield 2 appear sleeker in design. FIG. 1 illustrates the symmetrical configuration of the rodent shield 2.

In another embodiment of the rodent shield 2 there are no mounting tabs 8a-8d. This particular embodiment can be used on conduits that stem down from an acoustical ceiling, cooler box, or when the electrical box comes straight down from a conjunction box. Specifically, this embodiment can be used when the conduit is not against a surface and is instead free standing. When the conduit is free standing, the two rodent shields 2 can cover each side of the conduit and wrap around the conduit such that the conduit is sandwiched between the two rodent shields 2. A rivet gun, a pop rivet gun or a hose clamp can be used to secure the two rodent shields 2 to the free standing conduit. The hose clamp wraps around the conduit and the rodent shield 2 to secure it into place. It is preferable to tighten the hose clamp around one or both of the housings 6a, 6b; however, one house clamp can be used to secure the rodent shield 2 to the conduit and the hose clamp can be wrapped anywhere along the rodent shield 2 so long as it secures the rodent shield 2 to the conduit. The first side 12 and third side 16 of the body 4 of one rodent shield 2 can slide into the underside of the body 4 of another rodent shield 2. The housings 6a and 6b of each rodent shield can be adjusted to fit the size conduit by simply cutting the housings 6a and 6b at the appropriate height.

The rodent shield 2 can be stacked on top of each other in a vertical direction to shield a longer portion of the conduit. This can be done without having to cut any portion of the rodent shield 2. Therefore, one rodent shield 2 can be used alone, or a plurality of rodent shields 2 can be connected together along the length of a conduit and so on. The rodent shields 2 can also be placed staggered to one another; however, there should be a distance between each rodent shield 2 so that the rat is unable to reach and use each rodent shield 2 as a step.

Figure 3:
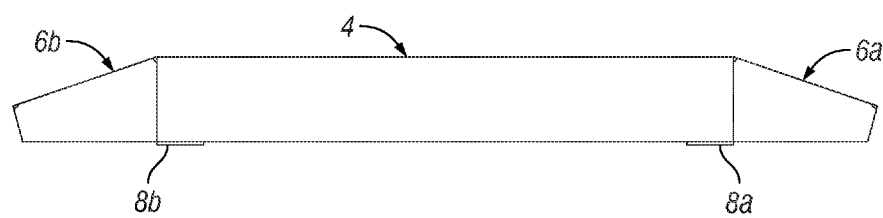
FIG. 3 illustrates a side view of the rodent shield, according to an embodiment of the present invention.

FIG. 3 illustrates a side view of the rodent shield, according to an embodiment comprising a body 4, two housings 6a, 6b, and two mounting tabs 8a, 8b. The embodiment illustrated in FIG. 3 shows the side of the body 4 that is about 1¾ inches tall and the height is even along the body 4. This description can be applied to the first side 12 or the third side 16, since both sides are symmetrical. The height of the body 4 can range from about 1¾ inches to about 2¼ inches. The mounting tabs 8a, 8b are substantially flat so as to sit against a surface. The housings 6a, 6b on both sides of the body 4 is shown tapering at a height of about 1¾ inches to about 1 inch. The design of the body 4 prevents the rodents from grabbing on to anything. Depending on the size of the conduit that needs to be shielded, the user cuts the housings 6a, 6b at a location to achieve the desired height.

Figure 4:
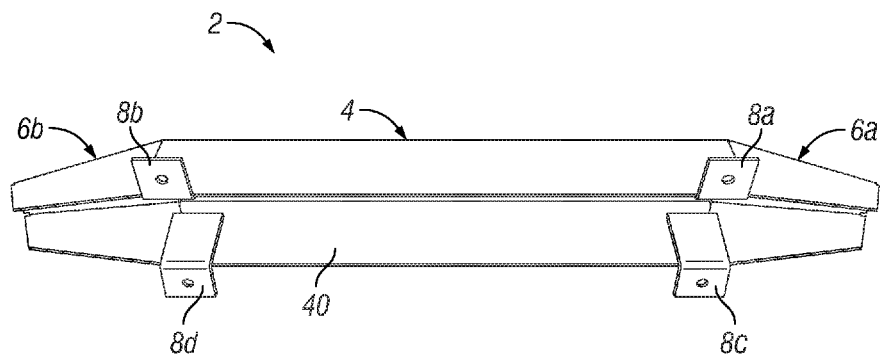
FIG. 4 illustrates a bottom perspective view of the rodent shield, according to an embodiment of the present invention.

FIG. 4 illustrates a bottom perspective view of the rodent shield 2, according to an embodiment comprising a body 4, mounting tabs 8a, 8b, 8c, and 8d and two housings 6a, 6b.

The bottom of the rodent shield 2 is open so that the conduit can sit in the cavity 40. The mounting tabs 8a, 8b, 8c, and 8d are bent at about 90 degrees. Each mounting tab 8a, 8b, 8c, and 8d is placed substantially flat against the internal surface of the body 4 so that the second portion of the mounting tab 8a, 8b, 8c, and 8d flares out and is about 90 degrees to the side of the body 4. The mounting tabs 8a, 8b, 8c, and 8d can be connected to the internal side of the body 4 using rivets or other fasteners. In another embodiment, the piece of the mounting tabs 8a, 8b, 8c, and 8d connected to the body 4 can be placed on the outside of the body 4. The mounting tabs 8a, 8b, 8c, and 8d can be placed at any point along the length of the body 4 on the first side 12 and third side 16; however, it is preferable to have the mounting tabs 8a, 8b, 8c, and 8d further apart along the longitudinal portion of the body 4 so that the rodents cannot jump from one set of mounting tabs 8a, 8b, 8c, and 8d to another. In another embodiment of the rodent shield 2, the mounting tabs 8a, 8b, 8c, and 8d are completely removed.

Figure 5:
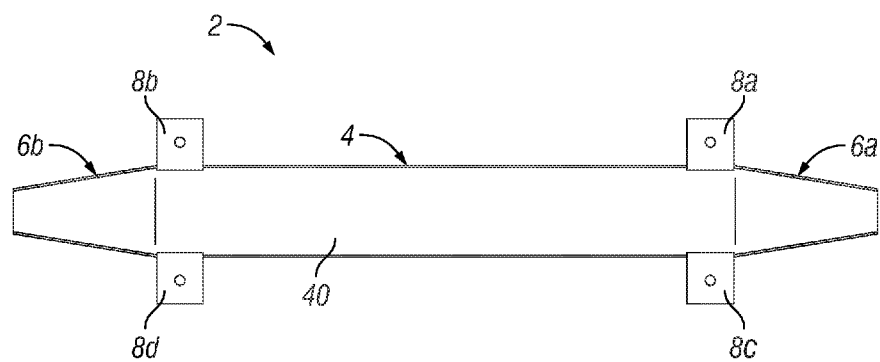
FIG. 5 illustrates a bottom view of the rodent shield, according to an embodiment of the present invention.

FIG. 5 illustrates a bottom view of the rodent shield 2, according to an embodiment comprising a body 4, mounting tabs 8a, 8b, 8c, and 8d, two housings 6a, 6b. FIG. 5 illustrates that the bottom side of the rodent shield 2 is open and forms a cavity 40. This allows the rodent shield 2 to be placed over a conduit without the need for bending the rodent shield 2. The portion that needs to be cut are the housings 6a, 6b, so the appropriate size can be achieved. When this is done, there is no void between the housings 6a, 6b and the conduit for the rodents to crawl through or grasp onto. The underside of the rodent shield 2 is also as smooth as the outside. This design allows for quick and easy installation saving the user time and money.

Figure 6:
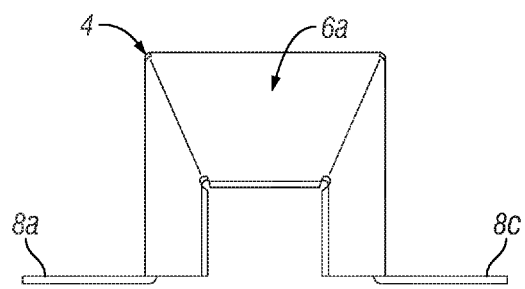
FIG. 6 illustrates a front view of the rodent shield, according to an embodiment of the present invention.

FIG. 6 illustrates a front view of the rodent shield 1, according to an embodiment comprising a housing 6a and two mounting tabs 8a, 8c. The rear view may be a mirror image of the front view. FIG. 6 illustrates the tapering of the housing 6a starting from the top of the body 4 and the mounting tabs 8a, 8c that are connected to the body 4 at about 90 degrees. When a smaller opening of the housing 6a is needed to fit around a smaller diameter conduit, the user will not need to cut the housing 6a. When a wider opening of the housing 6a is needed to fit around a larger diameter conduit, the user cuts the housing 6a at a distance closer to the body 4. Since the housing 6a is adjustable, it can fit tightly around a conduit and the need to fill the void space between the housing 6a and conduit is not necessary. The housings 6a, 6b of the rodent shield 1 can be precut by the manufacturer to achieve the desired diameter for the use on a conduit; however, the user can also easily cut the housings 6a, 6b immediately before installing. The rodent shield 1 is extremely versatile and easy to use because the user simply cuts the housings 6a, 6b and ensures that there is no more than about ¼ inch space between the conduit and the housings 6a, 6b. This ¼ inch space is about the maximum space allowed to prevent a roof rat from sliding between the rodent shield 1 and conduit.

Figure 7:
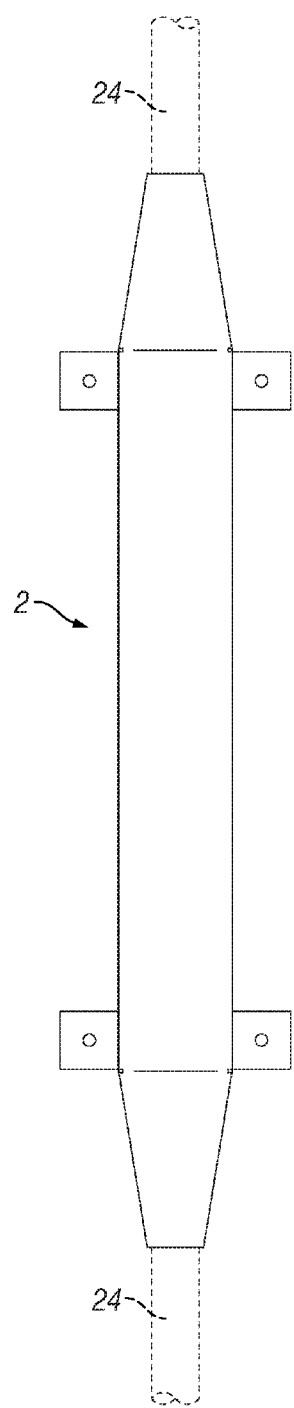
FIG. 7 illustrates a rodent shield covering a conduit, according to an embodiment of the present invention.

As shown in FIG. 7, there is a rodent shield 2 covering a conduit 24 (shown in phantom lines). If the conduit has a wider diameter, the user cuts the housings 6a, 6b at the location closer to the body 4 before installing it on the conduit 24.

An example embodiment of the sheet metal can have a minimum dimension of approximately sixteen inches in length by 5¼ inches in width. According to an embodiment of the present invention, the method of making the rodent shield 2 comprises using a sheet of rectangular shaped galvanized steel (18, 22, or 24 gauge); on each of a lengthwise side, measuring 2 to 2.5 inches from each corner along the lengthwise side toward the center; at each 2 to 2.5 inch mark, cutting a slit from the lengthwise edge substantially perpendicularly to the lengthwise side of no less than about 1¾ inches. Once four 1¾ inches slits have been made about 2 to 2.5 inches from the corner on each lengthwise side close to each of the four corners of the sheet, the middle piece is folded on both sides of the sheet inward, this forms the first side 12 and third side 16 of the body 4. To form the housing 6a, 6b, the method comprises crimping the housing first side 18 and housing third side 22 of the rodent shield 2; connecting the housing to the first side 12 of the body 4 and connecting the housing to the third side 16 of the body 4. The connections will be made by spot-welding, according to an embodiment of the present invention. The mounting tabs are formed by a separate sheet of thicker gauge galvanized steel, by cutting four 2.5 inches in length by 1 inch in width strips; at 1.5 inches from one end of each tab, bending the tab at generally a 90 degree angle; placing the 1.5 inches side of each tab substantially flush against the outside surface of the first side 12 and third side 16 of the body adjacent to the cut made between the housing 6a, 6b and body 4 so that the tabs sit on the body 4. The tabs are then joined to the body 4 via spot-welding in at least three places on each tab.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A rodent shield comprising:
   a body having at least three sides,
      a first side extending to a second side, the second side extending to a third side, the first side substantially parallel to the third side; the first side and third side substantially perpendicular to the second side,
      and at least two tapered housings, each having a first surface, a second surface, and a third surface; each tapered housing having a height descending from about 1¾ inches to about 1 inch and tapering from an opposing end of the body to a distal end of the tapered housing.

2. The rodent shied of claim 1, wherein the three sides form a cavity configured to cover an outer surface of a conduit, and wherein each of the tapered housings tapering from the opposing end of the body to a distal end such that a space between the outer surface of the conduit and an inner surface of the tapered housing at each distal end is no more than ¼ inch.

3. The rodent shield of claim 1, wherein a length of the first side, the second side, and the third side are about 12 inches.

4. The rodent shield of claim 1, wherein a height of the first side, a height of the third side, and a width of the second side are about 1¾ inches.

5. The rodent shield of claim 1, wherein the at least two tapered housings have a width descending from about 1¾ inches to about 1 inch.

6. The rodent shield of claim 1, wherein at least two mounting tabs are connected to at least one side of the body.

7. The rodent shield of claim 6, wherein the at least two mounting tabs are connected at generally a perpendicular angle to at least one side of the body.

8. The rodent shield of claim 6, wherein the mounting tabs are removable.

9. The rodent shield of claim 6, wherein the at least two mounting tabs are generally square.

10. The rodent shield of claim 1, comprised of a metallic material.

11. A rodent shield of claim 10, wherein the material is at least 24 gauge.

12. A rodent shield comprising:
    a body forming a cavity configured to cover an outer surface of a conduit and having an opening at each opposing end of the body configured for the conduit to run through, the body having an exposed side configured to lay flush against a flat surface; and
    at each opposing end of the body, a tapering portion having a height descending from about 1¾ inches to about 1 inch and having a width descending from about 1¾ inches to about 1 inch, the tapering portion tapering from the opposing end of the body to a distal end of the tapering portion such that a space between the outer surface of the conduit and an inner surface of the tapering portion at each distal end is no more than ¼ inch.

13. The rodent shield of claim 12, wherein a length of the body between the tapering portions is at least twelve inches.

14. The rodent shield of claim 12, wherein a height along the body between the tapering portions is at least 1¾ inches.

15. The rodent shield of claim 12, further comprising mounting fasteners on the body.

16. A rodent shield comprising:
    a body having at least three sides,
       a first side extending to a second side, the second side extending to a third side, the first side substantially parallel to the third side; the first side and third side substantially perpendicular to the second side,
       and at least two tapered housings, each having a first surface, a second surface, and a third surface; each tapered housing having a width descending from about 1¾ inches to about 1 inch and tapering from an opposing end of the body to a distal end of the tapered housing.

17. The rodent shied of claim 16, wherein the three sides form a cavity configured to cover an outer surface of a conduit, and wherein each of the tapered housings tapering from the opposing end of the body to a distal end such that a space between the outer surface of the conduit and an inner surface of the tapered housing at each distal end is no more than ¼ inch.

18. The rodent shield of claim 16, wherein a length of the first side, the second side, and the third side are about 12 inches.

19. The rodent shield of claim 16, wherein a height of the first side, a height of the third side, and a width of the second side are about 1¾ inches.

* * * * *